United States Patent
Hong

(10) Patent No.: US 11,178,700 B2
(45) Date of Patent: Nov. 16, 2021

(54) UNMANNED AERIAL VEHICLE MANAGEMENT METHOD AND APPARATUS, AND COMMUNICATION CONNECTION ESTABLISHMENT METHOD AND APPARATUS

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 44 days.

(21) Appl. No.: 16/631,440

(22) PCT Filed: Jul. 28, 2017

(86) PCT No.: PCT/CN2017/094943
§ 371 (c)(1),
(2) Date: Jan. 15, 2020

(87) PCT Pub. No.: WO2019/019164
PCT Pub. Date: Jan. 31, 2019

(65) Prior Publication Data
US 2020/0187262 A1    Jun. 11, 2020

(51) Int. Cl.
*H04W 74/08* (2009.01)
*H04W 4/40* (2018.01)
(Continued)

(52) U.S. Cl.
CPC ......... *H04W 74/0833* (2013.01); *H04W 4/40* (2018.02); *H04W 52/143* (2013.01); *H04W 52/243* (2013.01); *H04W 74/004* (2013.01)

(58) Field of Classification Search
CPC . H04W 74/0833; H04W 4/40; H04W 52/143; H04W 52/243; H04W 74/004
See application file for complete search history.

(56) References Cited

U.S. PATENT DOCUMENTS 10,044,465 B1 * 8/2018 Hetsko ............... B64D 45/0031
2008/0267127 A1 * 10/2008 Narasimha ........ H04W 36/0072
370/331
(Continued)

FOREIGN PATENT DOCUMENTS

| CN | 103340007 A | 10/2013 |
| CN | 103634929 A | 3/2014 |

(Continued)

OTHER PUBLICATIONS

Huawei et al., "Potential Enhancements for Drones", 3GPP TSG RAN WG1 Meeting #89 R1-1707016, May 19, 2017 (May 19, 2017), section 2.

(Continued)

*Primary Examiner* — Dinh Nguyen
(74) *Attorney, Agent, or Firm* — Syncoda LLC; Feng Ma

(57) ABSTRACT

A method for managing an unmanned aerial method includes: receiving a random-access request from an unmanned aerial vehicle, wherein the random-access request includes a preamble; in a case that the preamble is as same as a preset preamble, determining that the unmanned aerial vehicle is equipped with a dedicated chip for a cellular network unmanned aerial vehicle, and managing the unmanned aerial vehicle in an unmanned aerial vehicle management manner; or in a case that the preamble is different from the preset preamble, determining that the unmanned aerial vehicle is equipped with a terminal and establishes a communication connection through the terminal, and managing the unmanned aerial vehicle in a terminal management manner.

18 Claims, 14 Drawing Sheets

(51) Int. Cl.
*H04W 52/14* (2009.01)
*H04W 52/24* (2009.01)
*H04W 74/00* (2009.01)

(56) References Cited

U.S. PATENT DOCUMENTS

| | | | | |
|---|---|---|---|---|
| 2008/0273610 A1* | 11/2008 | Malladi | ............... | H04W 74/002 375/260 |
| 2009/0233594 A1* | 9/2009 | Duschesne | .......... | H04W 52/247 455/423 |
| 2013/0322367 A1* | 12/2013 | Kang | ..................... | H04B 7/022 370/329 |
| 2014/0036820 A1 | 2/2014 | Darren | | |
| 2016/0013858 A1 | 1/2016 | Zavada et al. | | |
| 2017/0201974 A1 | 7/2017 | Sohn et al. | | |
| 2017/0207847 A1 | 7/2017 | Jalali et al. | | |
| 2020/0137799 A1* | 4/2020 | Chang | ................ | H04B 7/18506 |

FOREIGN PATENT DOCUMENTS

| | | | |
|---|---|---|---|
| CN | 103718636 | A | 4/2014 |
| CN | 104053197 | A | 9/2014 |
| CN | 105206114 | A | 12/2015 |
| CN | 105592512 | A | 5/2016 |
| CN | 105636042 | A | 6/2016 |
| CN | 105830519 | A | 8/2016 |
| CN | 106664538 | A | 5/2017 |
| CN | 106912050 | A | 6/2017 |
| CN | 106953682 | A | 7/2017 |
| WO | 2016011433 | A2 | 1/2016 |

OTHER PUBLICATIONS

International Search Report in the international application No. PCT/CN2017/094943, dated Mar. 28, 2018.
English translation of the Written Opinion of the International Search Authority in the international application No. PCT/CN2017/094943, dated Mar. 28, 2018.
Motorola Mobility, Lenovo, CSI aspects of shortened TTI, 3GPP TSG RAN WG1#88bis, Apr. 7, 2017 (Apr. 7, 2017), entire document.
Zhong Hui, Performance Analysis and Optimization of MTC Random Access, China Doctoral Dissertation Full-text Database, Nov. 15, 2014 (Nov. 15, 2014), entire document.
First Office Action of the Chinese application No. 201780000710.6, dated Aug. 4, 2020.
Second Office Action of the Chinese application No. 201780000710.6, dated Mar. 22, 2021.

* cited by examiner

UNMANNED AERIAL VEHICLE MANAGEMENT METHOD AND APPARATUS, AND COMMUNICATION CONNECTION ESTABLISHMENT METHOD AND APPARATUS

CROSS-REFERENCE TO RELATED APPLICATION

This application is a national stage of International Application No. PCT/CN2017/094943 filed on Jul. 28, 2017, the disclosure of which is hereby incorporated by reference in its entirety.

TECHNICAL FIELD

The present disclosure relates to the field of terminal technologies, and more particularly to a method and device for managing an unmanned aerial vehicle, a method and device for establishing a communication connection, an electronic device and a computer readable storage medium.

BACKGROUND

At present, there are two types of cellular network unmanned aerial vehicles. The first is an unmanned aerial vehicle that is equipped with a dedicated chip for a cellular network unmanned aerial vehicle, and such an unmanned aerial vehicle may communicate with a base station in a cellular network through the dedicated chip. The second is an unmanned aerial vehicle that cannot communicate with the base station in the cellular network, and such an unmanned aerial vehicle often communicates with the base station by being equipped with a terminal capable of communicating with the base station.

However, the second type of unmanned aerial vehicle is not equipped with the dedicated chip for the cellular network unmanned aerial vehicle. The second type of unmanned aerial vehicle communicates with the base station, which substantially means that the second type of unmanned aerial vehicle communicates with the base station through the terminal. The second type of unmanned aerial vehicle is not an unmanned aerial vehicle dedicated to the cellular network; as such, the second type of unmanned aerial vehicle communicates with the base station, which may cause some interference to the cellular network.

SUMMARY

The present disclosure provides a method and device for managing an unmanned aerial vehicle, a method and device for establishing a communication connection, an electronic device and a computer readable storage medium, so as to solve the deficiencies in the related arts.

According to a first aspect of the embodiments of the present disclosure, a method for managing an unmanned aerial vehicle is provided, which may include the following operations.

A random-access request is received from the unmanned aerial vehicle, where the random-access request includes a preamble.

In a case that the preamble is as same as a preset preamble, it is determined that the unmanned aerial vehicle is equipped with a dedicated chip for a cellular network unmanned aerial vehicle, and the unmanned aerial vehicle is managed in an unmanned aerial vehicle management manner.

In a case that the preamble is different from the preset preamble, it is determined that the unmanned aerial vehicle is equipped with a terminal and establishes a communication connection through the terminal, and the unmanned aerial vehicle is managed in a terminal management manner.

Optionally, the operation that the unmanned aerial vehicle is managed in the unmanned aerial vehicle management manner may include the following operation.

Communication with the unmanned aerial vehicle is performed on at least one of: a dedicated time domain resource, a dedicated frequency domain resource, or a dedicated space domain resource.

Optionally, the operation that the unmanned aerial vehicle is managed in the unmanned aerial vehicle management manner may include the following operation.

Responsive to detecting that communication with the unmanned aerial vehicle interferes with another device, signal strength of the communication with the unmanned aerial vehicle is reduced.

Optionally, in a case that the preamble is different from the preset preamble, the method may further include the following operations.

Identification information of the unmanned aerial vehicle is recorded.

The identification information of the unmanned aerial vehicle is transmitted to another base station.

Optionally, in a case that the preamble is as same as the preset preamble, the method may further include the following operations.

Identification information of the unmanned aerial vehicle is recorded.

The identification information of the unmanned aerial vehicle is transmitted to another base station.

According to a second aspect of the embodiments of the present disclosure, a method for establishing a communication connection is provided, which may include the following operations.

A random-access request is transmitted to a base station according to a received connection establishment instruction, where the random-access request includes a preamble dedicated to a random-access procedure of an unmanned aerial vehicle which is equipped with a dedicated chip for a cellular network unmanned aerial vehicle.

Connection establishment acknowledgment information, which is transmitted by the base station according to the preamble, is received to establish the communication connection with the base station.

Optionally, before the random-access request is transmitted to the base station, the method may further include the following operation.

Multiple preambles, which are dedicated to random-access procedures of the unmanned aerial vehicle equipped with the dedicated chip for the cellular network unmanned aerial vehicle, are set according to a received setting instruction.

The operation that the random-access request is transmitted to the base station may include the following operations.

The random-access request including one of the multiple preambles is generated.

The random-access request is transmitted to the base station.

According to a third aspect of the embodiments of the present disclosure, a device for managing an unmanned aerial vehicle is provided, which may include a receiving module, a connection establishment module, and a management module.

The receiving module may be configured to receive a random-access request from the unmanned aerial vehicle, where the random-access request includes a preamble.

The connection establishment module may be configured to: establish, in a case that the preamble is as same as a preset preamble, a communication connection with the unmanned aerial vehicle; or establish, in a case that the preamble is different from the preset preamble, a communication connection with the unmanned aerial vehicle.

The management module may be configured to: manage, in a case that the preamble is as same as the preset preamble, the unmanned aerial vehicle in an unmanned aerial vehicle management manner; or manage, in a case that the preamble is different from the preset preamble, the unmanned aerial vehicle in a terminal management manner.

Optionally, the management module may be configured to communicate with the unmanned aerial vehicle on at least one of: a dedicated time domain resource, a dedicated frequency domain resource, or a dedicated space domain resource.

Optionally, the management module may be configured to reduce, responsive to detecting that communication with the unmanned aerial vehicle interferes with another device, signal strength of the communication with the unmanned aerial vehicle.

Optionally, the device for managing the unmanned aerial vehicle may further include a first recording module and a first transmission module.

The first recording module is configured to record, in a case that the preamble is different from the preset preamble, identification information of the unmanned aerial vehicle.

The first transmission module is configured to transmit the identification information of the unmanned aerial vehicle to another base station.

Optionally, the device for managing the unmanned aerial vehicle may further include a second recording module and a second transmission module.

The second recording module is configured to record, in a case that the preamble is as same as the preset preamble, identification information of the unmanned aerial vehicle.

The second transmission module is configured to transmit the identification information of the unmanned aerial vehicle to another base station.

According to a fourth aspect of the embodiments of the present disclosure, a device for establish a communication connection is provided, which may include an access module and a connection module.

The access module is configured to transmit, according to a received connection establishment instruction, a random-access request to a base station, where the random-access request includes a preamble dedicated to a random-access procedure of an unmanned aerial vehicle which is equipped with a dedicated chip for a cellular network unmanned aerial vehicle.

The connection module is configured to receive connection establishment acknowledgment information, which is transmitted by the base station according to the preamble, to establish the communication connection with the base station.

In some embodiments, the device for establishing the communication connection may further include a setting module.

The setting module is configured to set, according to a received setting instruction, multiple preambles dedicated to random-access procedures of the unmanned aerial vehicle which is equipped with the dedicated chip for the cellular network unmanned aerial vehicle.

The access module includes a generation sub-module and a transmission sub-module.

The generation sub-module is configured to generate the random-access request including one of the multiple preambles.

The transmission sub-module is configured to transmit the random-access request to the base station.

According to a fifth aspect of the embodiments of the present disclosure, an electronic device is provided, which may include:

a processor; and a memory storing instructions executable by the processor.

The processor is configured to:

receive a random-access request from an unmanned aerial vehicle, where the random-access request includes a preamble;

in a case that the preamble is as same as a preset preamble, determine that the unmanned aerial vehicle is equipped with a dedicated chip for a cellular network unmanned aerial vehicle, and manage the unmanned aerial vehicle in an unmanned aerial vehicle management manner; or in a case that the preamble is different from the preset preamble, determine that the unmanned aerial vehicle is equipped with a terminal and establishes a communication connection through the terminal, and manage the unmanned aerial vehicle in a terminal management manner.

According to a sixth aspect of the embodiments of the present disclosure, an electronic device is provided, which may include:

a processor; and a memory configured to store instructions executable by the processor.

The processor is configured to:

transmit, according to a received connection establishment instruction, a random-access request to a base station, where the random-access request includes a preamble dedicated to a random-access procedure of an unmanned aerial vehicle which is equipped with a dedicated chip for a cellular network unmanned aerial vehicle; and receive connection establishment acknowledgment information, which is transmitted by the base station according to the preamble, to establish a communication connection with the base station.

According to a seventh aspect of the embodiments of the present disclosure, a computer readable storage medium is provided. The computer readable storage medium stores a computer program that, when executed by a processor, causes the processor to perform the following operations.

A random-access request is received from an unmanned aerial vehicle, where the random-access request includes a preamble.

In a case that the preamble is as same as a preset preamble, it is determined that the unmanned aerial vehicle is equipped with a dedicated chip for a cellular network unmanned aerial vehicle, and the unmanned aerial vehicle is managed in an unmanned aerial vehicle management manner.

In a case that the preamble is different from the preset preamble, it is determined that the unmanned aerial vehicle is equipped with a terminal and establishes a communication connection though the terminal, and the unmanned aerial vehicle is managed in a terminal management manner.

According to an eighth aspect of the embodiments of the present disclosure, a computer readable storage medium is provided. The computer readable storage medium stores a computer program that, when executed by a processor, causes the processor to perform the following operations.

A random-access request is transmitted to a base station according to a received connection establishment instruction, where the random-access request includes a preamble dedicated to a random-access procedure of an unmanned aerial vehicle which is equipped with a dedicated chip for a cellular network unmanned aerial vehicle.

Connection establishment acknowledgment information, which is transmitted by the base station according to the preamble, is received to establish a communication connection with the base station.

The technical solutions provided by the embodiments of the present disclosure may include the following beneficial effects.

As can be seen from the embodiments above, the present disclosure may accurately distinguish an unmanned aerial vehicle which is equipped with a dedicated chip for a cellular network unmanned aerial vehicle from an unmanned aerial vehicle which is equipped with a terminal and which establishes a communication connection through the terminal. Moreover, the unmanned aerial vehicle which is equipped with the dedicated chip for the cellular network unmanned aerial vehicle is managed in an unmanned aerial vehicle management manner, and the unmanned aerial vehicle which is equipped with the terminal and which establishes the communication connection through the terminal is managed in a terminal management manner, thereby preventing the unmanned aerial vehicle, which is equipped with the terminal and which establishes the communication connection through the terminal, from interfering with a cellular network corresponding to a base station.

It should be understood that the general descriptions above and detailed descriptions below are only exemplary and explanatory and not intended to limit the present disclosure.

BRIEF DESCRIPTION OF THE DRAWINGS

In order to describe the technical solutions in the embodiments of the present disclosure more clearly, the drawings used in describing the embodiments will be briefly introduced below. It is apparent that the drawings described below are only some embodiments of the present disclosure. Those of ordinary skill in the art may also obtain other drawings according to these drawings without creative work.

DETAILED DESCRIPTION

Figure 1:
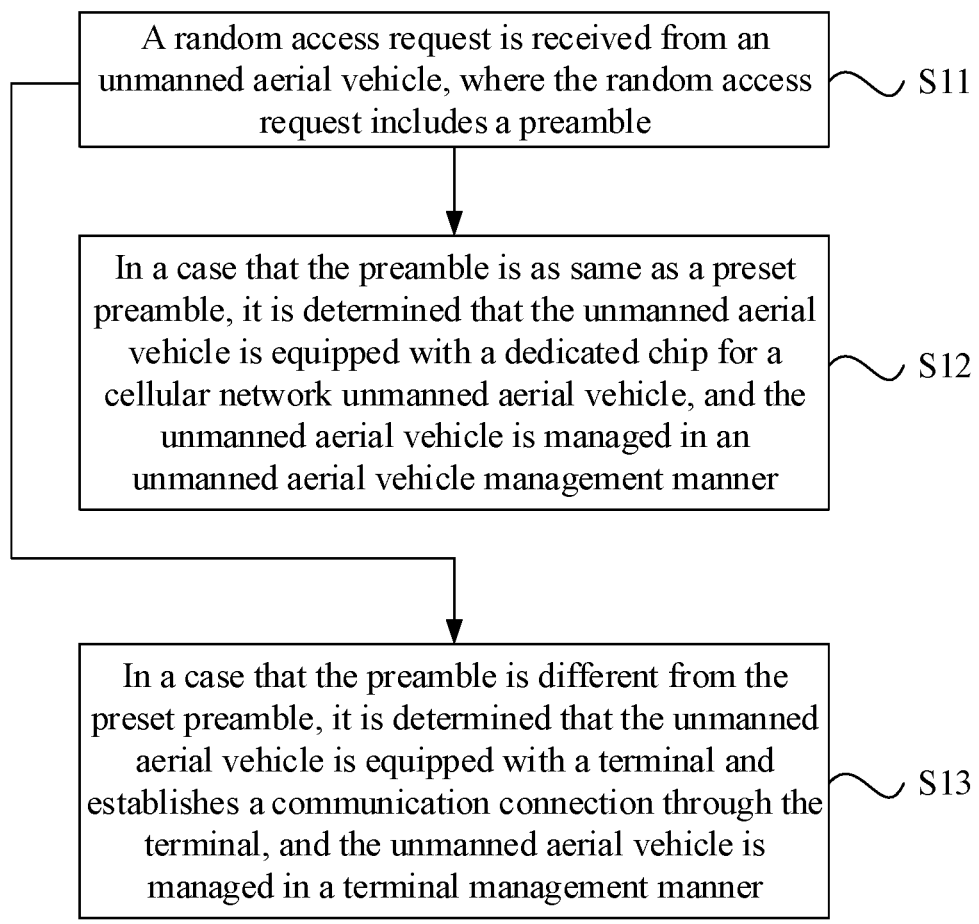
FIG. 1 is a flowchart of a method for managing an unmanned aerial vehicle according to an exemplary embodiment.

The technical solutions in the embodiments of the present disclosure will be clearly and completely described below with reference to the drawings in the embodiments of the present disclosure. It is apparent that the described embodiments are only a part of the embodiments of the present disclosure, but not all of the embodiments. All other embodiments obtained by those of ordinary skill in the art based on the embodiments of the present disclosure without creative efforts fall within the scope of protection of the present disclosure.

In S11, a random-access request is received from an unmanned aerial vehicle, where the random-access request includes a preamble.

In S12, in a case that the preamble is as same as a preset preamble, it is determined that the unmanned aerial vehicle is equipped with a dedicated chip for a cellular network unmanned aerial vehicle, and the unmanned aerial vehicle is managed in an unmanned aerial management manner.

In S13, in a case that the preamble is different from the preset preamble, it is determined that the unmanned aerial vehicle is equipped with a terminal and establishes a communication connection through the terminal, and the unmanned aerial vehicle is managed in a terminal management manner.

In an embodiment, a preamble dedicated to a random-access procedure may be set in advance for an unmanned aerial vehicle which is equipped with a dedicated chip for a cellular network unmanned aerial vehicle, and the preamble is as same as a preset preamble stored in a base station. The unmanned aerial vehicle which is equipped with the dedicated chip for the cellular network unmanned aerial vehicle may transmit, during the random-access procedure, a random-access request carrying the preamble.

An unmanned aerial vehicle which is equipped with a terminal (e.g., a mobile device such as a mobile phone) can transmit a random-access request to the base station through the terminal and the random-access request also includes a preamble, but the preamble is not a dedicated preamble, so the preamble is different from the preset preamble stored in the base station.

The base station may extract, after receiving the random-access request, the preamble in the random-access request, and determine whether the preamble extracted is as same as the preset preamble. If the preamble is as same as the preset preamble, it may be determined that the unmanned aerial vehicle transmitting the random-access request is an unmanned aerial vehicle which is equipped with the dedicated chip for the cellular network unmanned aerial vehicle, and the unmanned aerial vehicle may be managed in an unmanned aerial vehicle management manner. If the preamble is different from the preset preamble, it may be determined that the unmanned aerial vehicle transmitting the random-access request is an unmanned aerial vehicle which is equipped with the terminal and which transmits the random-access request through the terminal, and the unmanned aerial vehicle may be managed in a terminal management manner.

Based on this, it is possible to accurately distinguish the unmanned aerial vehicle which is equipped with the dedicated chip for the cellular network unmanned aerial vehicle from the unmanned aerial vehicle which is equipped with the terminal and which establishes the communication connection through the terminal. Further, the unmanned aerial vehicle which is equipped with the dedicated chip for the cellular network unmanned aerial vehicle is managed in the unmanned aerial vehicle management manner, and the unmanned aerial vehicle which is equipped with the terminal and which establishes the communication connection through the terminal is managed in the terminal management manner, so that the unmanned aerial vehicle which is equipped with the terminal and which establishes the communication connection through the terminal is prevented from interfering with the cellular network corresponding to the base station.

Figure 2:
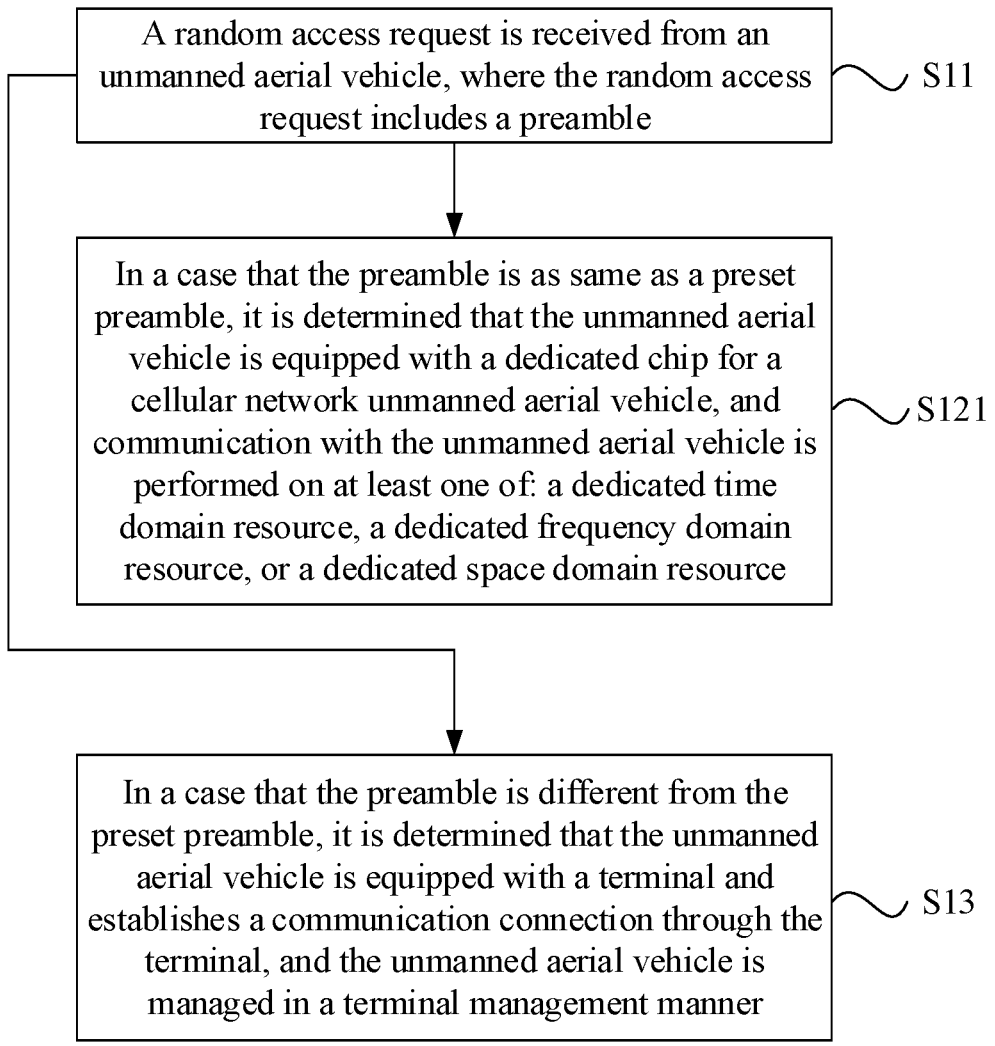
FIG. 2 is a flowchart of another method for managing an unmanned aerial vehicle according to an exemplary embodiment.

FIG. 2 is a flowchart of another method for managing an unmanned aerial vehicle according to an exemplary embodiment. As illustrated in FIG. 2, the unmanned aerial vehicle is managed in the unmanned aerial vehicle management manner includes the following operation.

In S121, communication with the unmanned aerial vehicle is performed on at least one of: a dedicated time domain resource, a dedicated frequency domain resource, or a dedicated space domain resource.

In an embodiment, at least one of a dedicated time domain resource, a dedicated frequency domain resource, or a dedicated space domain resource may be allocated for the unmanned aerial vehicle which is equipped with the dedicated chip for the cellular network unmanned aerial vehicle. Here, the dedicated time domain resource is different from a time domain resource used for communication between the base station and the terminal, and the dedicated frequency domain resource is different from a frequency domain resource used for communication between the base station and the terminal, thereby ensuring that the base station may communicate well with the unmanned aerial vehicle. The dedicated space domain resource includes a space domain resource that avoid a route of a flight, so as to avoid impact of the communication with the unmanned aerial vehicle on the flight, or impact of communication of the flight on the communication of the unmanned aerial vehicle.

Figure 3:
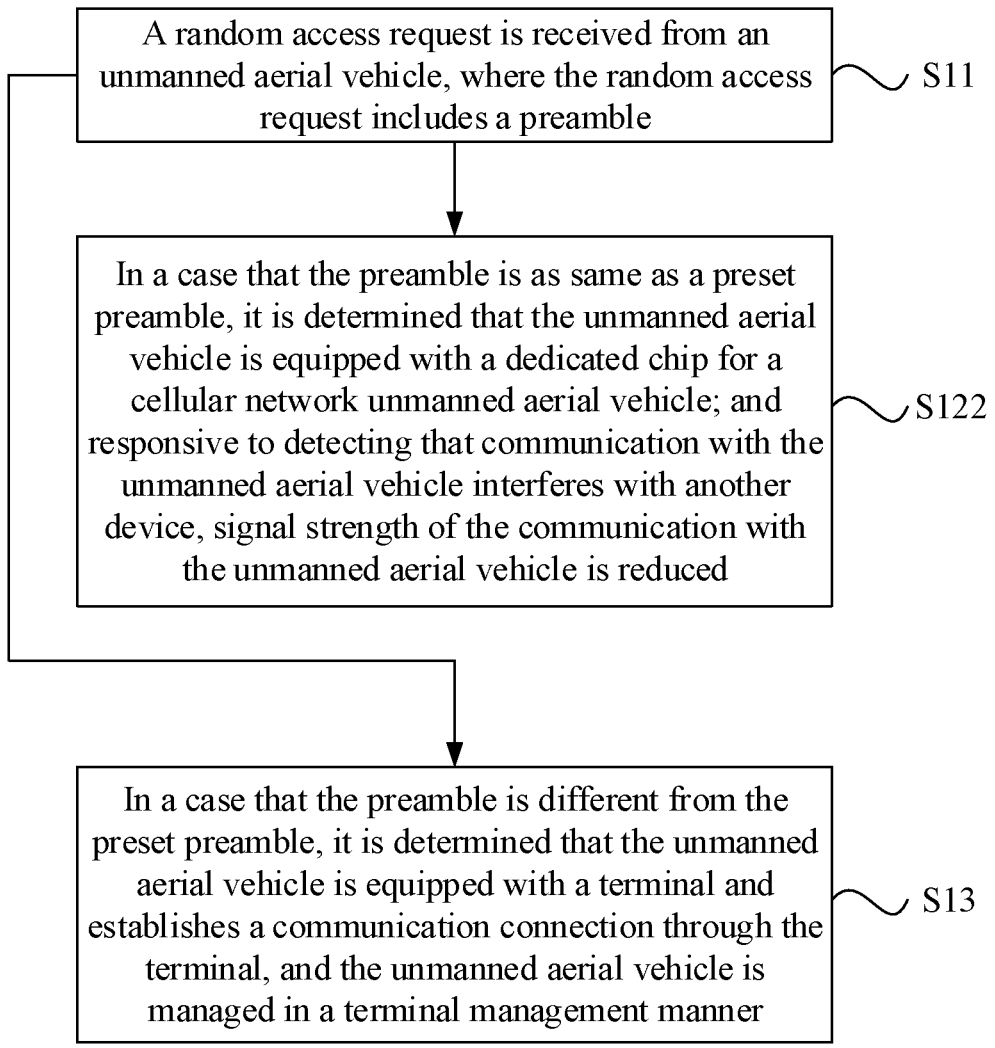
FIG. 3 is a flowchart of yet another method for managing an unmanned aerial vehicle according to an exemplary embodiment.

FIG. 3 is a flowchart of yet another method for managing an unmanned aerial vehicle according to an exemplary embodiment. As illustrated in FIG. 3, the unmanned aerial vehicle is managed in the unmanned aerial vehicle management manner includes the following operation.

In S122, responsive to detecting that communication with the unmanned aerial vehicle interferes with another device, signal strength of the communication with the unmanned aerial vehicle is reduced.

In an embodiment, when it is detected that communication with the unmanned aerial vehicle which is equipped with the dedicated chip for the cellular network unmanned aerial vehicle interferes with another device (for example, since the unmanned aerial vehicle flies at higher altitudes and there are fewer objects capable of blocking signal transmission, the unmanned aerial vehicle may receive signals from more base stations and may establish a communication connection with a more distant base station across a closer base station, so that a signal transmitted from the more distant base station to the unmanned aerial vehicle may pass through the closer base station, which affects a device in communication with the closer base station), in this case, according to the terminal management manner, the communication connection may be directly disconnected; according to the unmanned aerial vehicle management manner, the signal strength of the communication with the unmanned aerial vehicle can be reduced, thereby ensuring that the communication with the unmanned aerial vehicle can still be performed, and the impact of this communication process on other devices is alleviated.

Figure 4:
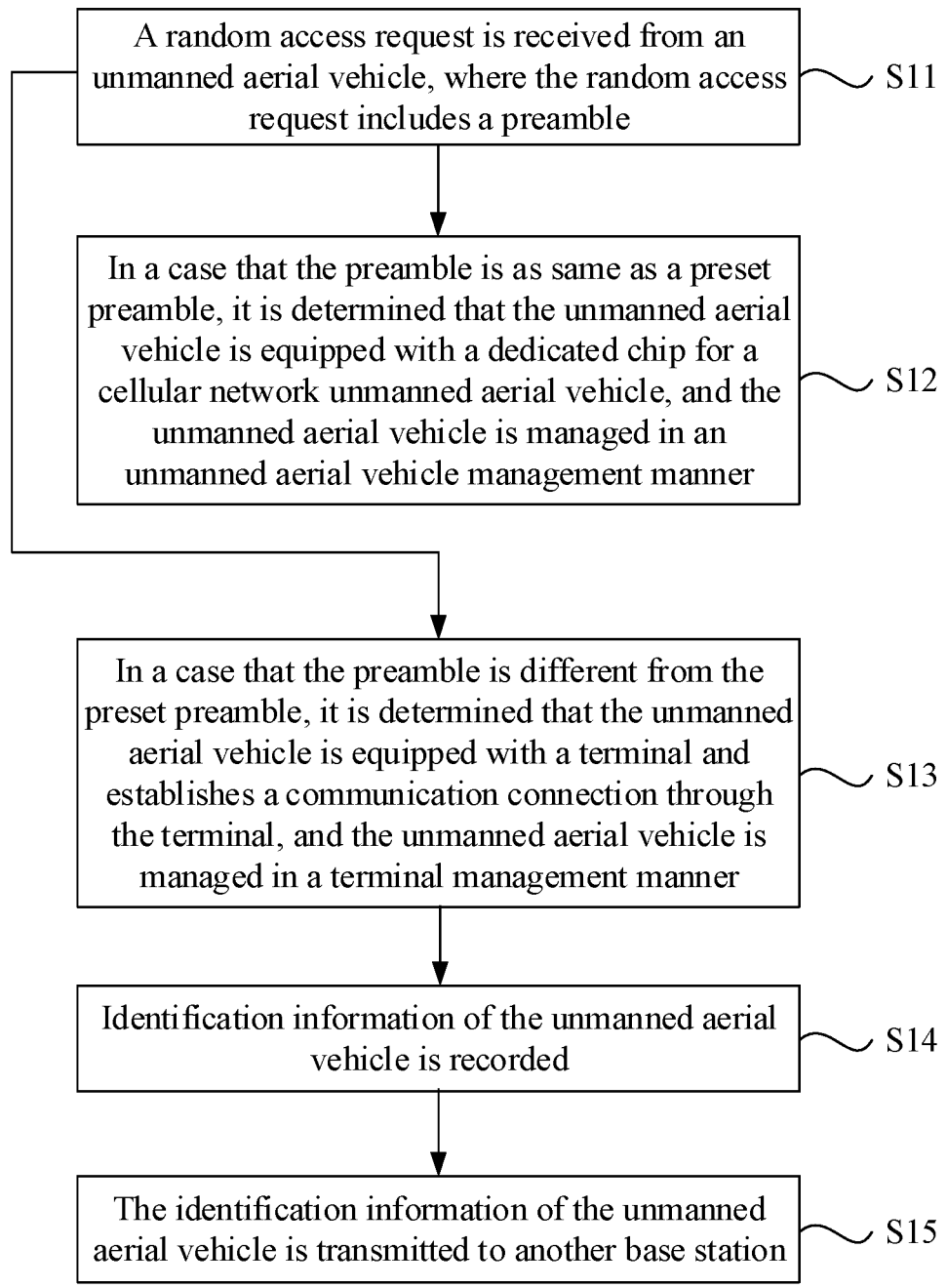
FIG. 4 is a flowchart of still another method for managing an unmanned aerial vehicle according to an exemplary embodiment.

FIG. 4 is a flowchart of still another method for managing an unmanned aerial vehicle according to an exemplary embodiment. As illustrated in FIG. 4, in a case that the preamble is different from the preset preamble, the method further includes the following operations.

In S14, identification information of the unmanned aerial vehicle is recorded.

In S15, the identification information of the unmanned aerial vehicle is transmitted to another base station.

In an embodiment, if the preamble is different from the preset preamble, it may be determined that the unmanned aerial vehicle transmitting the random-access request is an unmanned aerial vehicle which is equipped with the terminal and which transmits the random-access request through the terminal. The unmanned aerial vehicle needs to be managed in the terminal management manner. For example, the unmanned aerial vehicle is managed as a common mobile phone.

In this case, identification information of the unmanned aerial vehicle may be recorded. Since the random-access request includes the identification information of the unmanned aerial vehicle transmitting the random-access request, the identification information is transmitted to another base station, so that upon reception of the random-access request by the another base station from the unmanned aerial vehicle, the another base station can determine, according to the identification information of the unmanned aerial vehicle, that the unmanned aerial vehicle is an unmanned aerial vehicle which is equipped with the terminal and which transmits the random-access request through the terminal, without performing a comparison on the preamble in the random-access request. Thus, a base station which does not store the preset preamble in advance can quickly and accurately determine that the unmanned aerial vehicle is an unmanned aerial vehicle which is equipped with the terminal and which transmits the random-access request through the terminal, and then manages the unmanned aerial vehicle in the terminal management manner.

Figure 5:
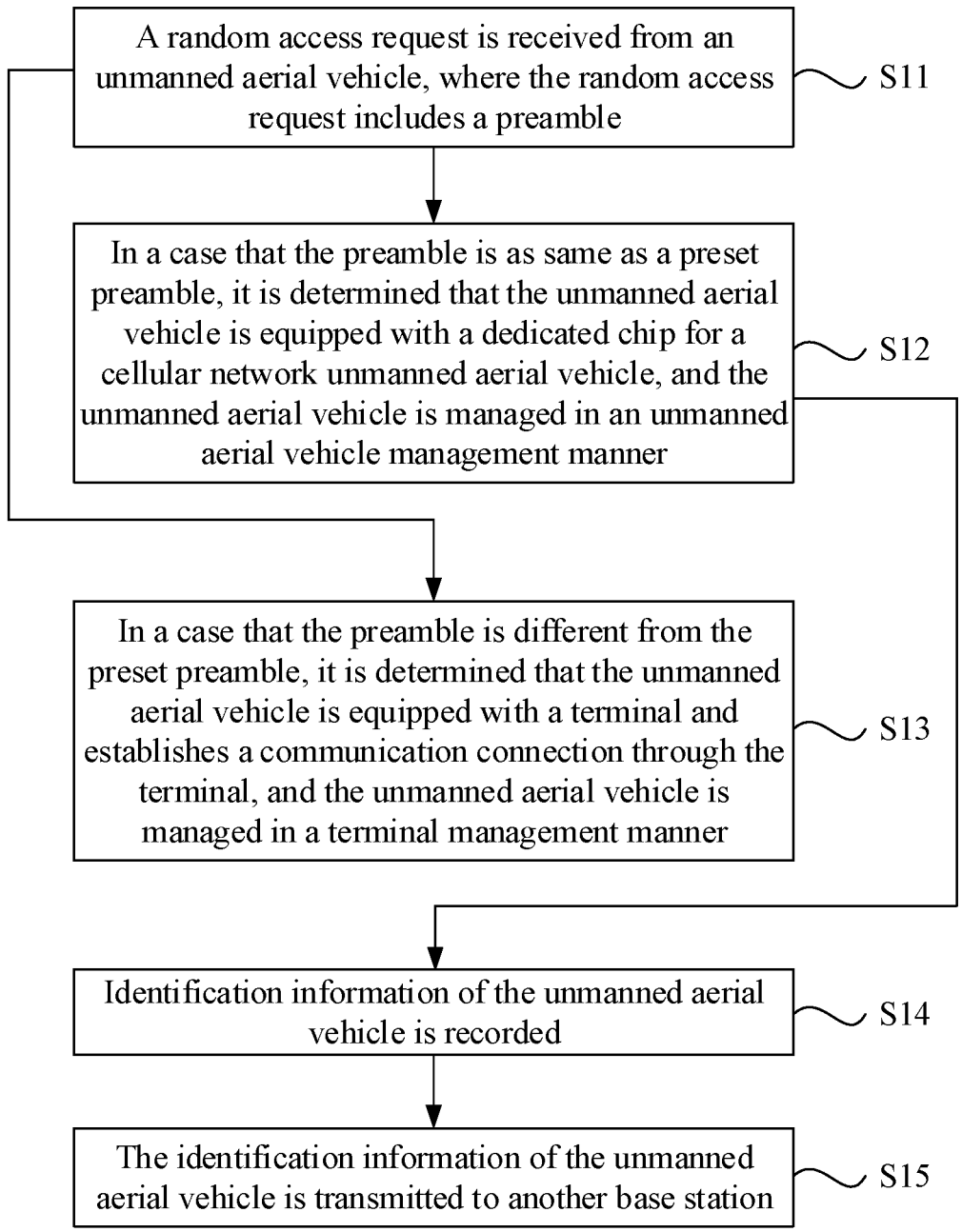
FIG. 5 is a flowchart of yet still another method for managing an unmanned aerial vehicle according to an exemplary embodiment.

FIG. 5 is a flowchart of yet still another method for managing an unmanned aerial vehicle according to an exemplary embodiment. As illustrated in FIG. 5, in a case that the preamble is as same as the preset preamble, the method further includes the following operations.

In S16, identification information of the unmanned aerial vehicle is recorded.

In S17, the identification information of the unmanned aerial vehicle is transmitted to another base station.

In an embodiment, if the preamble is as same as the preset preamble, it may be determined that the unmanned aerial vehicle transmitting the random-access request is an unmanned aerial vehicle which is equipped with the dedicated chip for the cellular network unmanned aerial vehicle, and the unmanned aerial vehicle is managed in the unmanned aerial vehicle management manner.

In this case, identification information of the unmanned aerial vehicle may be recorded. Since the random-access request includes the identification information of the unmanned aerial vehicle transmitting the random-access request, the identification information is transmitted to another base station, so that upon reception of the random-access request by the another base station from the unmanned aerial vehicle, the another base station can determine, according to the identification information of the unmanned aerial vehicle, that the unmanned aerial vehicle is an unmanned aerial vehicle which is equipped with the dedicated chip for the cellular network unmanned aerial vehicle, without performing a comparison on the preamble in the random-access request. Thus, a base station which does not store the preset preamble in advance can quickly and accurately determine that the unmanned aerial vehicle is an unmanned aerial vehicle which is equipped with the dedicated chip for the cellular network unmanned aerial vehicle, and then manages the unmanned aerial vehicle in the unmanned aerial vehicle management manner.

Figure 6:
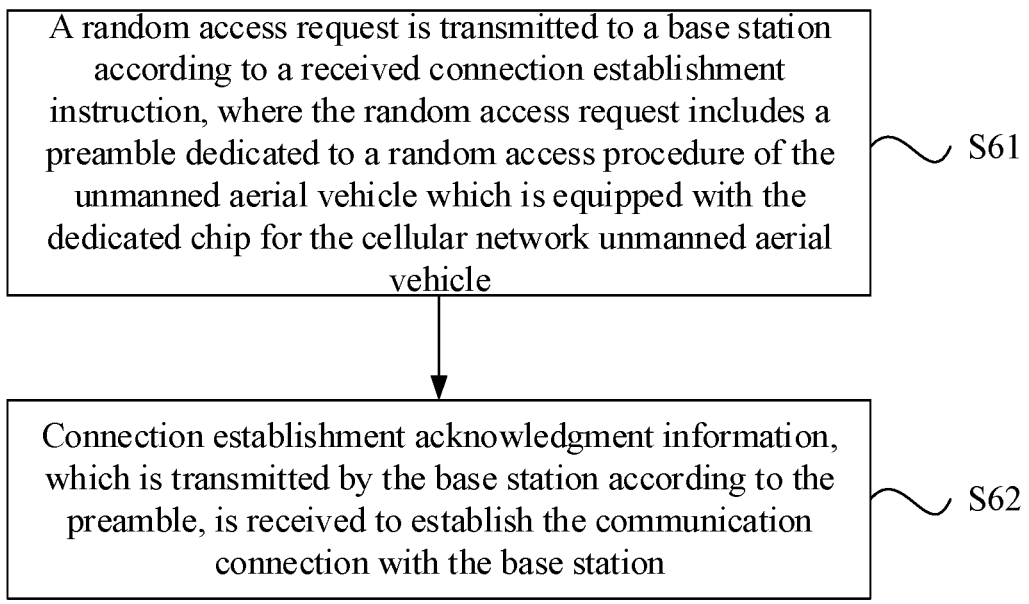
FIG. 6 is a flowchart of a method for establishing a communication connection according to an exemplary embodiment.

FIG. 6 is a flowchart of a method for establishing a communication connection according to an exemplary embodiment. The embodiment illustrated in FIG. 6 may be applied to an unmanned aerial vehicle which is equipped with a dedicated chip for a cellular network unmanned aerial vehicle. As illustrated in FIG. 6, the method for establishing the communication connection includes the following operations.

In S61, a random-access request is transmitted to a base station according to a received connection establishment instruction, where the random-access request includes a preamble dedicated to a random-access procedure of the unmanned aerial vehicle which is equipped with the dedicated chip for the cellular network unmanned aerial vehicle.

In S62, connection establishment acknowledgment information, which is transmitted by the base station according to the preamble, is received to establish the communication connection with the base station.

In an embodiment, the preamble dedicated to the random-access procedure of the unmanned aerial vehicle which is equipped with the dedicated chip for the cellular network unmanned aerial vehicle is preset in the unmanned aerial vehicle which is equipped with the dedicated chip for the cellular network unmanned aerial vehicle. During the random-access procedure to the base station, the dedicated preamble may be added into the random-access request transmitted to the base station, so that the base station can determine, according to the dedicated preamble, that the unmanned aerial vehicle transmitting the random-access request is the unmanned aerial vehicle which equipped with the dedicated chip for the cellular network unmanned aerial vehicle. Further, after the communication connection is established, the unmanned aerial vehicle can be managed in an unmanned aerial vehicle management manner.

Figure 7:
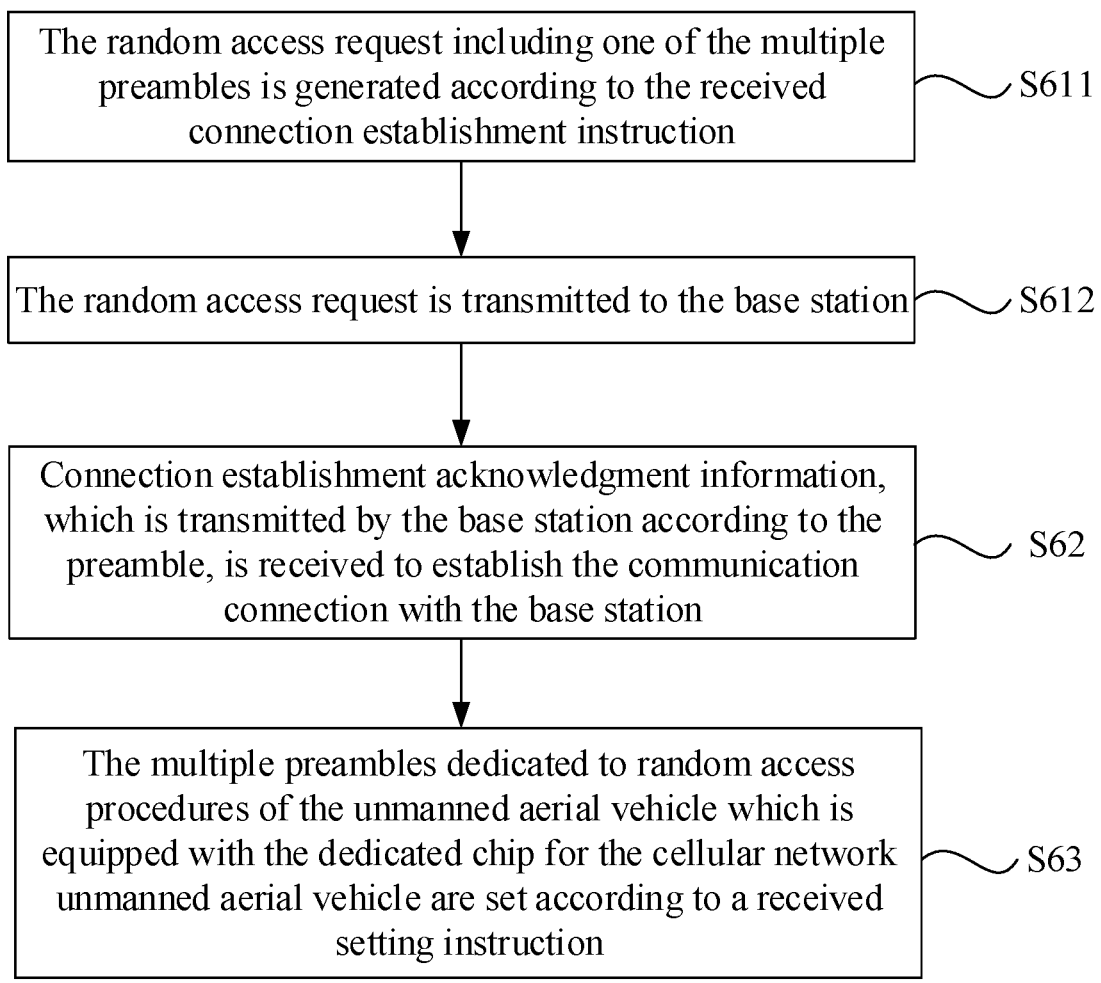
FIG. 7 is a flowchart of another method for establishing a communication connection according to an exemplary embodiment.

FIG. 7 is a flowchart of another method for establishing a communication connection according to an exemplary embodiment. As illustrated in FIG. 7, before the random-access request is transmitted to the base station, the method further includes the following operations.

In S63, multiple preambles dedicated to random-access procedures of the unmanned aerial vehicle which is equipped with the dedicated chip for the cellular network unmanned aerial vehicle are set according to a received setting instruction.

The random-access request is transmitted to the base station includes the following operations.

In S611, the random-access request including one of the multiple preambles is generated.

In S612, the random-access request is transmitted to the base station.

In an embodiment, multiple preambles dedicated to the random-access procedures of the unmanned aerial vehicle which is equipped with the dedicated chip for cellular network unmanned aerial vehicle may be preset for the unmanned aerial vehicle equipped with the dedicated chip for the cellular network unmanned aerial vehicle for storage, so that the unmanned aerial vehicle can transmits random-access requests to different base stations according to different preambles.

Corresponding to the aforementioned embodiments of the methods for managing the unmanned aerial vehicle and the methods for establishing the communication connection, the present disclosure also provides embodiments of devices for managing an unmanned aerial vehicle and devices for establishing a communication connection.

Figure 8:
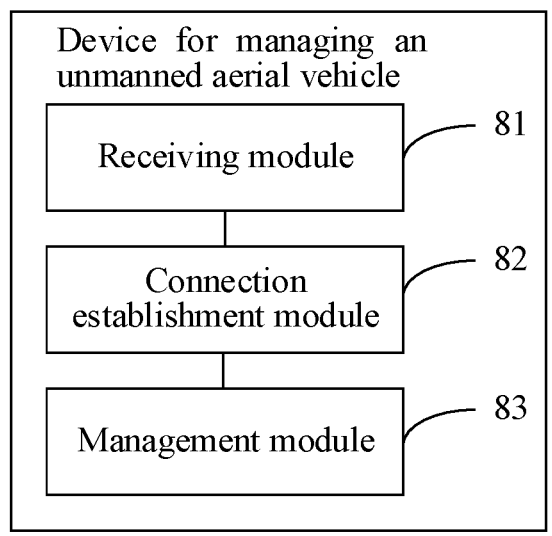
FIG. 8 is a block diagram of a device for managing an unmanned aerial vehicle according to an exemplary embodiment.

FIG. 8 is a block diagram of a device for managing an unmanned aerial vehicle according to an exemplary embodiment. Referring to FIG. 8, the device for managing the unmanned aerial vehicle includes a receiving module 81, a connection establishment module 82 and a management module 83.

The receiving module 81 is configured to receive a random-access request from the unmanned aerial vehicle, where the random-access request includes a preamble.

The connection establishment module 82 is configured to: establish, in a case that the preamble is as same as a preset preamble, a communication connection with the unmanned aerial vehicle; or establish, in a case that the preamble is different from the preset preamble, a communication connection with the unmanned aerial vehicle.

The management module 83 is configured to: manage, in a case that the preamble is as same as the preset preamble, the unmanned aerial vehicle in an unmanned aerial vehicle management manner; or manage, in a case that the preamble is different from the preset preamble, the unmanned aerial vehicle in a terminal management manner.

Optionally, the management module is configured to communicate with the unmanned aerial vehicle on at least one of: a dedicated time domain resource, a dedicated frequency domain resource, or a dedicated space domain resource.

Optionally, the management module is configured to reduce, responsive to detecting that communication with the unmanned aerial vehicle interferes with another device, signal strength of the communication with the unmanned aerial vehicle.

Figure 9:
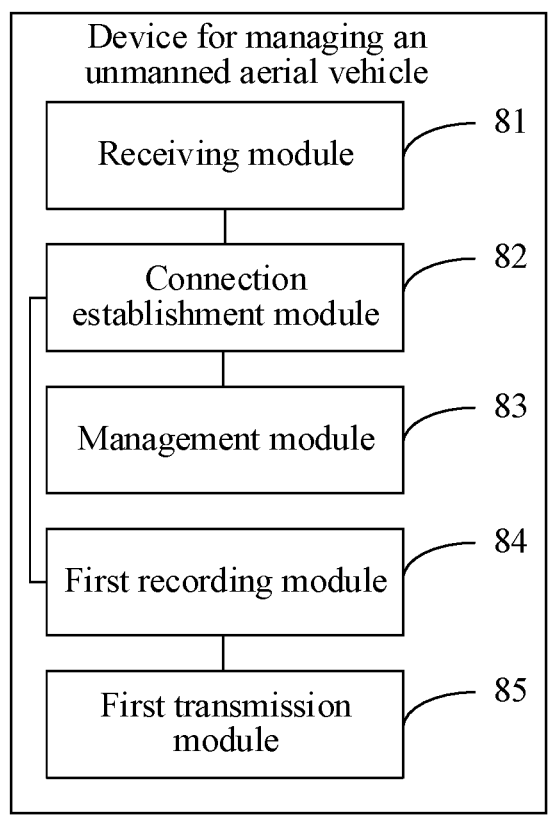
FIG. 9 is a block diagram of another device for managing an unmanned aerial vehicle according to an exemplary embodiment.

FIG. 9 is a block diagram of another device for management an unmanned aerial vehicle according to an exemplary embodiment. Referring to FIG. 9, the device for managing the unmanned aerial vehicle further includes a first recording module 84 and a first transmission module 85.

The first recording module 84 is configured to record, in a case that the preamble is different from the preset preamble, identification information of the unmanned aerial vehicle.

The first transmission module 85 is configured to transmit the identification information of the unmanned aerial vehicle to another base station.

Figure 10:
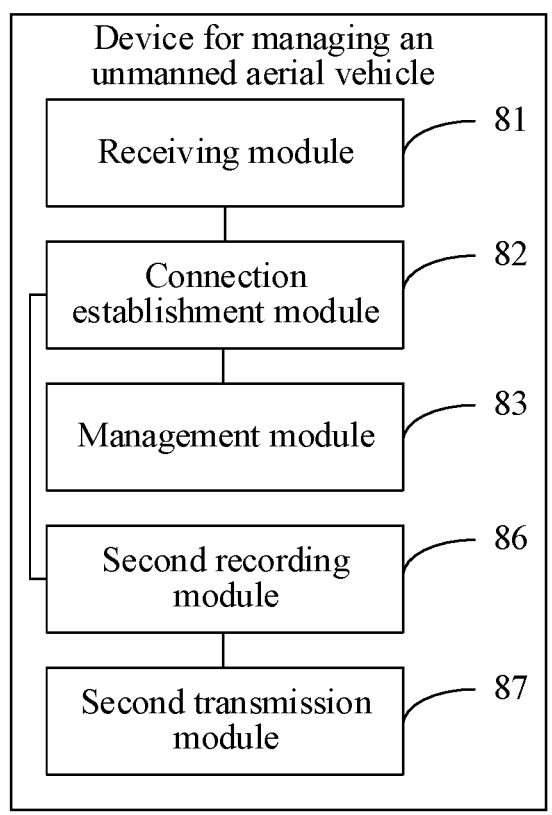
FIG. 10 is a block diagram of yet another device for managing an unmanned aerial vehicle according to an exemplary embodiment.

FIG. 10 is a block diagram of yet another device for managing an unmanned aerial vehicle according to an exemplary embodiment. As illustrated in FIG. 10, the device for managing the unmanned aerial vehicle further includes a second recording module 86 and a second transmission module 87.

The second recording module 86 is configured to record, in a case that the preamble is as same as the preset preamble, identification information of the unmanned aerial vehicle.

The second transmission module 87 is configured to transmit the identification information of the unmanned aerial vehicle to another base station.

Figure 11:
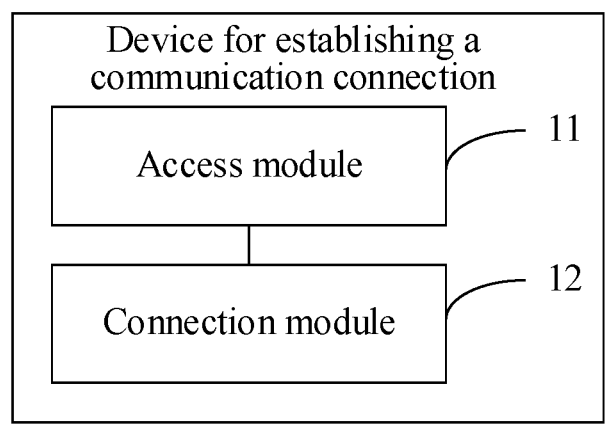
FIG. 11 is a block diagram of a device for establishing a communication connection according to an exemplary embodiment.

FIG. 11 is a block diagram of a device for establishing a communication connection according to an exemplary embodiment. As illustrated in FIG. 11, the device for establishing the communication connection includes an access module 11 and a connection module 12.

The access module 11 is configured to transmit, according to a received connection establishment instruction, a random-access request to a base station, where the random-access request includes a preamble dedicated to a random-access procedure of an unmanned aerial vehicle which is equipped with a dedicated chip for a cellular network unmanned aerial vehicle.

The connection module 12 is configured to receive connection establishment acknowledgment information, which is transmitted by the base station according to the preamble, to establish the communication connection with the base station.

Figure 12:
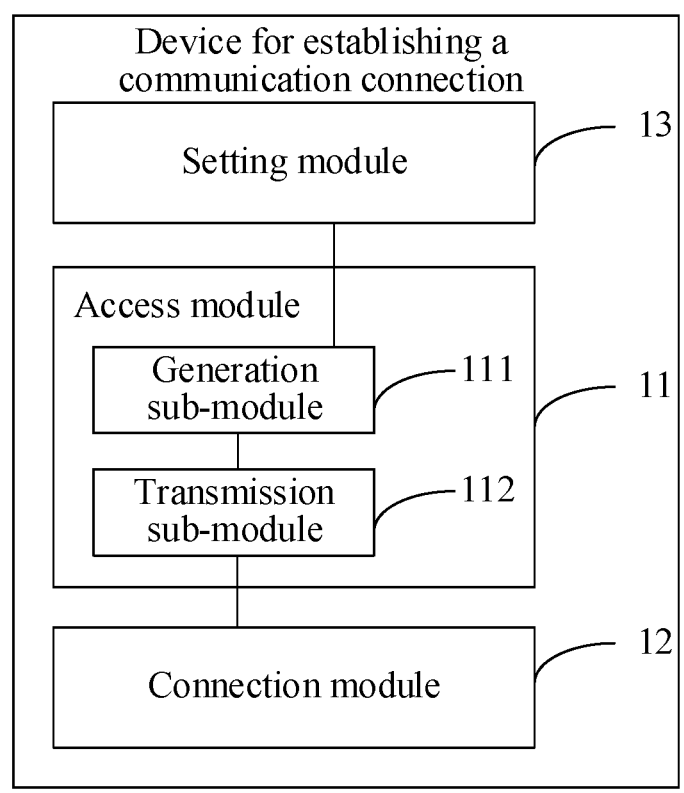
FIG. 12 is a block diagram of another device for establishing a communication connection according to an exemplary embodiment.

FIG. 12 is a block diagram of another device for establishing a communication connection according to an exemplary embodiment. As illustrated in FIG. 12, the device for establishing the communication connection further includes a setting module 13.

The setting module 13 is configured to set, according to a received setting instruction, multiple preambles dedicated to random-access procedures of the unmanned aerial vehicle which is equipped with the dedicated chip for the cellular network unmanned aerial vehicle.

The access module 11 includes a generation sub-module 111 and a transmission sub-module 112.

The generation sub-module 111 is configured to generate the random-access request including one of the multiple preambles.

The transmission sub-module 112 is configured to transmit the random-access request to the base station.

With regard to the devices in the above embodiments, the specific manner in which the respective modules perform the operations has been described in detail in the embodiments relating to the methods, and will not be explained in detail herein.

The device embodiments substantially correspond to the method embodiments, and thus related parts refer to part of descriptions of the method embodiments. The device embodiments described above are only schematic. The modules described as separate parts therein may or may not be physically separated, and parts displayed as modules may or may not be physical modules, and namely may be located in the same place or may also be distributed to multiple network modules. Part or all of the modules therein may be selected according to a practical requirement to achieve the purpose of the solutions of the present disclosure. Those of ordinary skill in the art may understand and implement without creative work.

The present disclosure also provides an electronic device. The electronic device includes:

a processor; and a memory configured to store instructions executable by the processor.

The processor is configured to:

receive a random-access request from an unmanned aerial vehicle, where the random-access request includes a preamble;

in a case that the preamble is as same as a preset preamble, determine that the unmanned aerial vehicle is equipped with a dedicated chip for a cellular network unmanned aerial vehicle, and manage the unmanned aerial vehicle in an unmanned aerial vehicle management manner; or in a case that the preamble is different from the preset preamble, determine that the unmanned aerial vehicle is equipped with a terminal and establishes a communication connection through the terminal, and manage the unmanned aerial vehicle in a terminal management manner.

The present disclosure also provides an electronic device. The electronic device includes:

a processor; and a memory configured to store instructions executable by the processor.

The processor is configured to:

transmit, according to a received connection establishment instruction, a random-access request to a base station, where the random-access request includes a preamble dedicated to a random-access procedure of an unmanned aerial vehicle which is equipped with a dedicated chip for a cellular network unmanned aerial vehicle; and receive connection establishment acknowledgment information which is transmitted by the base station according to the preamble, so as to establish a communication connection with the base station.

The present disclosure also provides a computer readable storage medium having stored thereon a computer program that, when executed by a processor, causes the processor to perform the following operations.

A random-access request is received from an unmanned aerial vehicle, where the random-access request includes a preamble.

In a case that the preamble is as same as a preset preamble, it is determined that the unmanned aerial vehicle is equipped with a dedicated chip for a cellular network unmanned aerial vehicle, and the unmanned aerial vehicle is managed in an unmanned aerial vehicle management manner.

In a case that the preamble is different from the preset preamble, it is determined that the unmanned aerial vehicle is equipped with a terminal and establishes a communication connection through the terminal, and the unmanned aerial vehicle is managed in a terminal management manner.

The present disclosure also provides a computer readable storage medium having stored thereon a computer program that, when executed by a processor, causes the processor to perform the following operations.

A random-access request is transmitted to a base station according to a received connection establishment instruction, where the random-access request includes a preamble dedicated to a random-access procedure of an unmanned aerial vehicle which is equipped with a dedicated chip for a cellular network unmanned aerial vehicle.

Connection establishment acknowledgment information, which is transmitted sent by the base station according to the preamble, is received to establish a communication connection with the base station.

Figure 13:
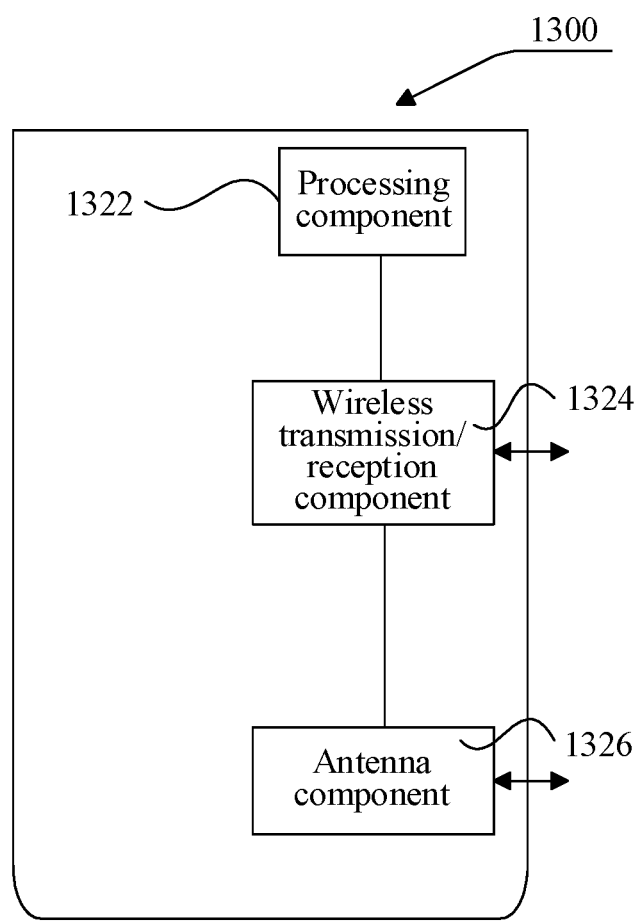
FIG. 13 is a block diagram of a device for managing an unmanned aerial vehicle according to an exemplary embodiment.

As illustrated in FIG. 13, FIG. 13 is a block diagram of a device 1300 for managing an unmanned aerial vehicle according to an exemplary embodiment. The device 1300 may be provided as a base station. Referring to FIG. 13, the device 1300 includes a processing component 1322, a wireless transmission/reception component 1324, an antenna component 1326 and a wireless interface-specific signal processing portion. The processing component 1322 may further include one or more processors. One processor in the processing component 1322 may be configured to perform the method for managing the unmanned aerial vehicle in any one embodiment in FIG. 1 to FIG. 5.

Figure 14:
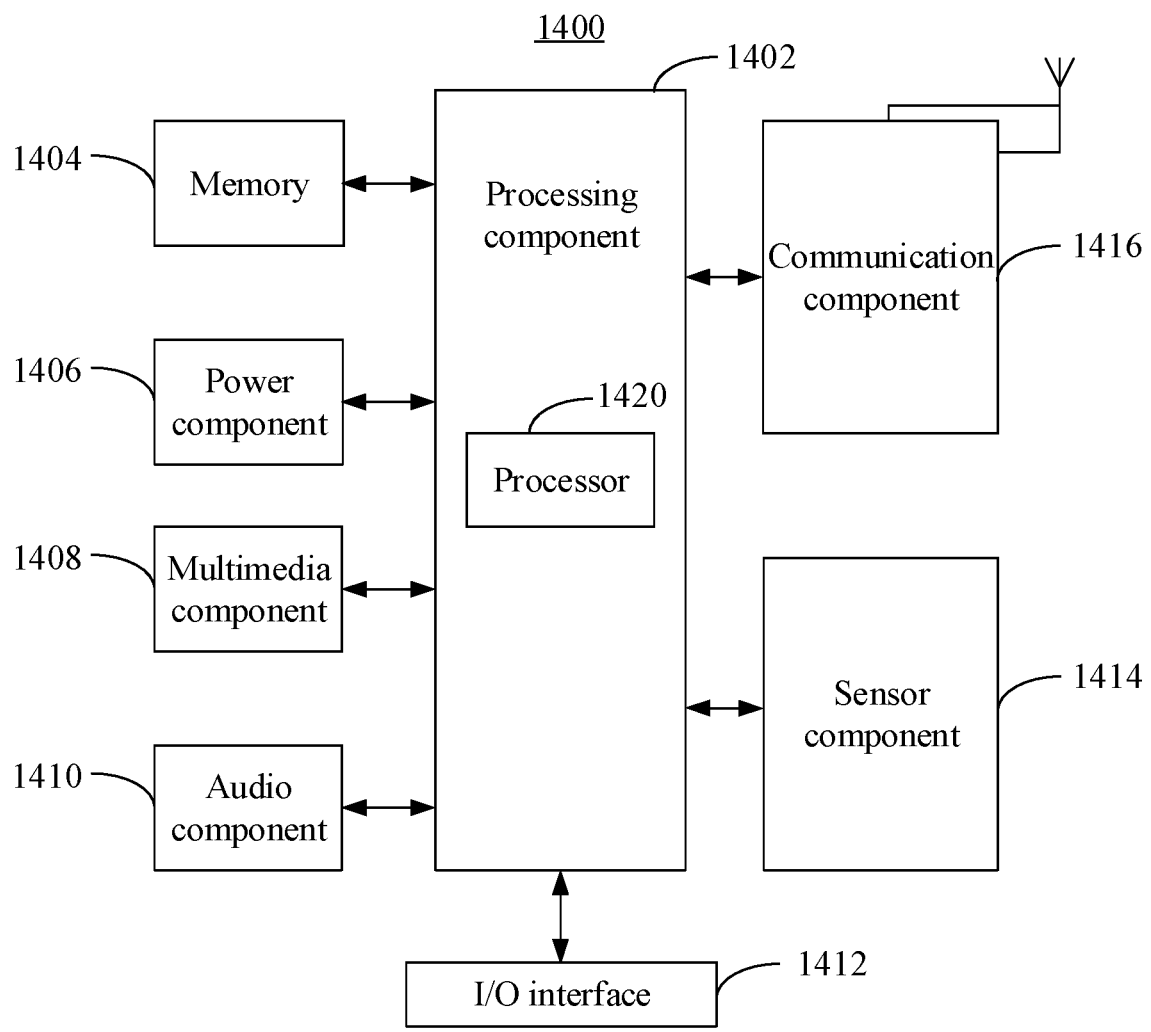
FIG. 14 is a block diagram of a device for establishing a communication connection according to an exemplary embodiment.

FIG. 14 is a block diagram of a device 1400 for establishing a communication connection according to an exemplary embodiment. For example, the device 1400 may be a mobile phone, a computer, a digital broadcast terminal, a messaging device, a gaming console, a tablet, a medical device, exercise equipment, a personal digital assistant, or the like.

Referring to FIG. 14, the device 1400 may include one or more of the following components: a processing component 1402, a memory 1404, a power component 1406, a multimedia component 1408, an audio component 1410, an input/output (I/O) interface 1412, a sensor component 1414, and a communication component 1416.

The processing component 1402 typically controls overall operations of the device 1400, such as the operations associated with display, telephone calls, data communications, camera operations, and recording operations. The processing component 1402 may include one or more processors 1420 to execute instructions to perform all or part of the operations in the above described methods. Moreover, the processing component 1402 may include one or more modules which facilitate the interaction between the processing component 1402 and other components. For example, the processing component 1402 may include a multimedia module to facilitate the interaction between the multimedia component 1408 and the processing component 1402.

The memory 1404 is configured to store various types of data to support the operations of the device 1400. Examples of such data include instructions for any applications or methods operated on the device 1400, contact data, phonebook data, messages, pictures, video, etc. The memory 1404 may be implemented using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1406 provides power to various components of the device 1400. The power component 1406 may include a power management system, one or more power sources, and any other components associated with the generation, management, and distribution of power for the device 1400.

The multimedia component 1408 includes a screen providing an output interface between the device 1400 and the user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, slides and gestures on the TP. The touch sensors may not only sense a boundary of a touch or slide action but also detect a duration and pressure associated with the touch or slide action. In some embodiments, the multimedia component 1408 includes at least one of a front camera or a rear camera. The at least one of the front camera or the rear camera may receive external multimedia data when the device 1400 is in an operation mode, such as an image acquiring mode or a video mode. Each of the front camera and the rear camera may be a fixed optical lens system or has focusing and optical zooming capabilities.

The audio component 1410 is configured to perform at least one of an audio signal input or an audio signal output. For example, the audio component 1410 includes a microphone (MIC) configured to receive an external audio signal when the device 1400 is in an operation mode, such as a call mode, a recording mode, and a voice recognition mode. The received audio signal may be further stored in the memory 1404 or transmitted via the communication component 1416. In some embodiments, the audio component 1410 further includes a speaker configured to output audio signals.

The I/O interface 1412 provides an interface between the processing component 1402 and peripheral interface modules. The peripheral interface modules may be for example, a keyboard, a click wheel, buttons, and the like. The buttons may include, but are not limited to, a home button, a volume button, a starting button, and a locking button.

The sensor component 1414 includes one or more sensors configured to provide status assessments of various aspects of the device 1400. For example, the sensor component 1414 may detect an on/off status of the device 1400 and relative positioning of components (e.g., the components may be a display and small keyboard of the device 1400). The sensor component 1414 may further detect a change in a position of the device 1400 or a component of the device 1400, presence or absence of contact between the user and the device 1400, orientation or acceleration/deceleration of the device 1400 and a change in temperature of the device 1400. The sensor component 1414 may include a proximity sensor configured to detect presence of an object nearby without any physical contact. The sensor component 1414 may also include a light sensor (such as a Complementary Metal Oxide Semiconductor (CMOS) or Charge Coupled Device (CCD) image sensor) configured for use in an imaging application. In some embodiments, the sensor component 1414 may also include an acceleration sensor, a gyroscope sensor, a magnetic sensor, a pressure sensor or a temperature sensor.

The communication component 1416 is configured to facilitate wired or wireless communication between the device 1400 and other devices. The device 1400 can access a wireless network based on a communication standard, such as Wi-Fi, 2G, or 3G, or a combination thereof. In one exemplary embodiment, the communication component 1416 receives a broadcast signal or information associated with broadcast from an external broadcast management system via a broadcast channel. In one exemplary embodiment, the communication component 1416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, or other technologies.

In exemplary embodiments, the device 1400 may be implemented with one or more of the following for performing the methods illustrated in FIG. 6 or FIG. 7: an application specific integrated circuit (ASIC), a digital signal processor (DSP), a digital signal processing device (DSPD), a programmable logic device (PLD), a field programmable gate array (FPGA), a controller, a micro-controller, a microprocessor, or other electronic components.

In exemplary embodiments, there is also provided a non-transitory computer readable storage medium including instructions, such as the memory 1404 including instructions. The instructions can be executed by the processor 1420 in the device 1400 to perform the above-described methods. For example, the non-transitory computer readable storage medium may be a ROM, a Random-access Memory (RAM), a Compact Disc Read-Only Memory (CD-ROM), a magnetic tape, a floppy disc, an optical data storage device or the like.

In the present disclosure, relational terms "first", "second" and the like are adopted only to distinguish one entity or operation from another entity or operation and not always to require or imply existence of any such practical relationship or sequence between the entities or operations. Terms "include" and "comprises" or any other variation thereof are intended to cover nonexclusive inclusions, so that a process, method, object or device including a series of elements not only includes those elements, but also includes other elements that are not clearly listed, or further includes elements intrinsic to the process, the method, the object or the device. Under the condition of no more limitations, an element defined by statement "including a/an . . . " does not exclude existence of another same element in a process, method, object or device including the element.

The methods and devices provided by the embodiments of the present disclosure are introduced above in detail. The principle and implementation modes of the present disclosure are elaborated with specific examples. The embodiments above are described only to help to understand the methods and the core concepts of the present disclosure. In addition, those of ordinary skilled in the art may make variations to the specific implementation modes and application scope according to the concepts of the present disclosure. To sum up, the contents of the specification should not be understood as limits to the present disclosure.

The invention claimed is:

1. A method for managing an unmanned aerial vehicle, implemented by a base station, the method comprising:
   receiving a random-access request from an unmanned aerial vehicle, wherein the random-access request comprises a preamble;
   determining whether the preamble is the same as a preset preamble in the base station;
   in response to determining that the preamble is the same as the preset preamble, determining that the unmanned aerial vehicle is equipped with a dedicated chip for a cellular network unmanned aerial vehicle, and managing the unmanned aerial vehicle in an unmanned aerial vehicle management manner; and
   in response to determining that the preamble is different from the preset preamble, determining that the unmanned aerial vehicle is equipped with a terminal and establishes a communication connection through the terminal, and managing the unmanned aerial vehicle in a terminal management manner.

2. The method of claim 1, wherein the managing the unmanned aerial vehicle in the unmanned aerial vehicle management manner comprises:
   communicating with the unmanned aerial vehicle on at least one of a dedicated time domain resource or a dedicated frequency domain resource.

3. The method of claim 1, wherein the managing the unmanned aerial vehicle in the unmanned aerial vehicle management manner comprises:
   responsive to detecting that communication with the unmanned aerial vehicle interferes with another device, reducing signal strength of the communication with the unmanned aerial vehicle.

4. The method of claim 1, further comprising: in response to determining that the preamble is different from the preset preamble,
   recording identification information of the unmanned aerial vehicle; and
   transmitting the identification information of the unmanned aerial vehicle to another base station.

5. The method of claim 1, further comprising: in response to determining that the preamble is the same as the preset preamble,
   recording identification information of the unmanned aerial vehicle; and
   transmitting the identification information of the unmanned aerial vehicle to another base station.

6. A device for managing an unmanned aerial vehicle, for use in a base station, and the device comprising:
   a processor;
   a transceiver; and
   a memory for storing instructions executable by the processor to cause the processor to:
   receive, through the transceiver, a random-access request from an unmanned aerial vehicle, wherein the random-access request comprises a preamble;
   determine whether the preamble is the same as a preset preamble in the base station;
   in response to determining that the preamble is the same as the preset preamble, determine that the unmanned aerial vehicle is equipped with a dedicated chip for a cellular network unmanned aerial vehicle, and manage the unmanned aerial vehicle in an unmanned aerial vehicle management manner; and
   in response to determining that the preamble is different from the preset preamble, determine that the unmanned aerial vehicle is equipped with a terminal and establishes a communication connection through the terminal, and manage the unmanned aerial vehicle in a terminal management manner.

7. The device of claim 6, wherein the processor is configured to communicate with the unmanned aerial vehicle through the transceiver on at least one of a dedicated time domain resource or a dedicated frequency domain resource, in response to determining that the unmanned aerial vehicle is equipped with the dedicated chip for the cellular network unmanned aerial vehicle.

8. The device of claim 6, wherein the processor is configured to reduce, responsive to determining that the unmanned aerial vehicle is equipped with the dedicated chip for the cellular network unmanned aerial vehicle and detecting that communication with the unmanned aerial vehicle interferes with another device, signal strength of the communication with the unmanned aerial vehicle.

9. The device of claim 6, wherein
   the processor is configured to record, in response to determining that the preamble is different from the preset preamble, identification information of the unmanned aerial vehicle through the memory; and transmit, through the transceiver, the identification information of the unmanned aerial vehicle to another base station.

10. The device of claim 6, wherein
the processor is configured to record, in response to determining that the preamble is the same as the preset preamble, identification information of the unmanned aerial vehicle through the memory; and
transmit, through the transceiver, the identification information of the unmanned aerial vehicle to another base station.

11. The method of claim 4, wherein the identification information of the unmanned aerial vehicle is transmitted to the another base station through the random-access request.

12. The method of claim 5, wherein the identification information of the unmanned aerial vehicle is transmitted to the another base station through the random-access request.

13. The device of claim 9, wherein the identification information of the unmanned aerial vehicle is transmitted to the another base station through the random-access request.

14. A communication system implementing the method of claim 1, comprising the base station and the unmanned aerial vehicle, wherein the unmanned aerial vehicle is configured to:
transmit, according to a received connection establishment instruction, a random-access request to the base station, wherein the random-access request comprises a preamble dedicated to a random-access procedure of the unmanned aerial vehicle which is equipped with a dedicated chip for a cellular network unmanned aerial vehicle; and
receive connection establishment acknowledgment information which is transmitted by the base station according to the preamble, to establish the communication connection with the base station; and
wherein the base station is configured to prevent the unmanned aerial vehicle equipped with the terminal establishing the communication connection through the terminal from interfering with a cellular network corresponding to the base station.

15. The method of claim 1, wherein the managing the unmanned aerial vehicle in the unmanned aerial vehicle management manner comprises:
communicating with the unmanned aerial vehicle on a dedicated space domain resource.

16. The method of claim 1, wherein the managing the unmanned aerial vehicle in the terminal management manner comprises:
responsive to detecting that communication with the unmanned aerial vehicle interferes with another device, disconnecting the communication with the unmanned aerial vehicle.

17. The device of claim 6, wherein the processor is further configured to communicate with the unmanned aerial vehicle through the transceiver on a dedicated space domain resource, in response to determining that the unmanned aerial vehicle is equipped with the dedicated chip for the cellular network unmanned aerial vehicle.

18. The device of claim 6, wherein the processor is further configured to:
responsive to determining that the unmanned aerial vehicle is equipped with the terminal and establishes the communication connection through the terminal and detecting that communication with the unmanned aerial vehicle interferes with another device, disconnect the communication connection with the unmanned aerial vehicle.

* * * * *